United States Patent
Azzi

(10) Patent No.: US 9,321,356 B2
(45) Date of Patent: Apr. 26, 2016

(54) SYSTEM AND METHOD FOR BRAKING A HYBRID OR ELECTRIC TRACTION VEHICLE

(75) Inventor: Hamid Azzi, Maurepas (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 13/985,224

(22) PCT Filed: Feb. 14, 2012

(86) PCT No.: PCT/FR2012/050316
§ 371 (c)(1),
(2), (4) Date: Sep. 30, 2013

(87) PCT Pub. No.: WO2012/110736
PCT Pub. Date: Aug. 23, 2012

(65) Prior Publication Data
US 2014/0018986 A1    Jan. 16, 2014

(30) Foreign Application Priority Data
Feb. 14, 2011 (FR) ..................... 11 51185

(51) Int. Cl.
*B60L 7/26* (2006.01)
*B60L 7/18* (2006.01)

(52) U.S. Cl.
CPC ... *B60L 7/26* (2013.01); *B60L 7/18* (2013.01); *B60L 2250/26* (2013.01); *Y10S 903/947* (2013.01)

(58) Field of Classification Search
None
See application file for complete search history.

(56) References Cited

U.S. PATENT DOCUMENTS

| | | | | |
|---|---|---|---|---|
| 4,270,806 A | * | 6/1981 | Venkataperumal et al. | 303/3 |
| 4,818,036 A | * | 4/1989 | Reinecke | 303/50 |
| 5,322,352 A | * | 6/1994 | Ohno et al. | 303/3 |
| 5,433,512 A | * | 7/1995 | Aoki et al. | 303/3 |
| 5,496,099 A | * | 3/1996 | Resch | 303/114.1 |
| 5,564,797 A | * | 10/1996 | Steiner et al. | 303/113.4 |
| 5,833,327 A | * | 11/1998 | Kozakai | 303/113.4 |
| 5,857,755 A | * | 1/1999 | Aoki et al. | 303/152 |
| 5,927,829 A | * | 7/1999 | Saga et al. | 303/152 |
| 5,951,118 A | * | 9/1999 | Soejima | 303/113.1 |

(Continued)

FOREIGN PATENT DOCUMENTS

| EP | 1 327 556 | 7/2003 |
|---|---|---|
| JP | 2001 008306 | 1/2001 |

OTHER PUBLICATIONS

International Search Report Issued May 28, 2013 in PCT/FR12/050316 Filed Feb. 14, 2012.

(Continued)

*Primary Examiner* — Rami Khatib
*Assistant Examiner* — Navid Ziaeianmehdizadeh
(74) *Attorney, Agent, or Firm* — Oblon, McClelland, Maier & Neustadt, L.L.P.

(57) ABSTRACT

A braking system and method for a motor vehicle including a hybrid or electric traction system, including a decoupled brake pedal module, a hydraulic braking module, and an electric braking module used for recovery of electrical energy during braking carried out by the electric traction system, the decoupled braking module including a brake pedal and a mechanism controlling the hydraulic braking system and the electric braking module. The system measures at least one parameter associated with the pedal, and limits the recovery of electrical energy by the electric braking module.

9 Claims, 2 Drawing Sheets

(56) References Cited

U.S. PATENT DOCUMENTS

| | | | |
|---|---|---|---|
| 6,007,160 A * | 12/1999 | Lubbers et al. | 303/114.1 |
| 6,050,653 A * | 4/2000 | Wachi et al. | 303/113.4 |
| 6,142,581 A * | 11/2000 | Yamaguchi et al. | 303/113.2 |
| 6,158,824 A * | 12/2000 | Yonemura et al. | 303/113.5 |
| 6,192,308 B1 * | 2/2001 | Onuma | 701/70 |
| 6,227,629 B1 * | 5/2001 | Yoshida et al. | 303/155 |
| 6,234,585 B1 * | 5/2001 | Harris et al. | 303/20 |
| 6,234,589 B1 * | 5/2001 | Yoshida | 303/157 |
| 6,280,008 B1 * | 8/2001 | Yoshida | 303/155 |
| 6,292,753 B1 * | 9/2001 | Sugimoto et al. | 701/301 |
| 6,312,064 B1 * | 11/2001 | Koike et al. | 303/155 |
| 6,322,168 B1 * | 11/2001 | Ohnuma | 303/155 |
| 6,334,655 B2 * | 1/2002 | Tanaka et al. | 303/113.4 |
| 6,367,322 B1 * | 4/2002 | Rump | 303/114.3 |
| 6,367,889 B1 * | 4/2002 | Tsubouchi et al. | 303/113.4 |
| 6,409,288 B2 * | 6/2002 | Yoshida et al. | 303/155 |
| 6,460,942 B1 * | 10/2002 | Shimizu et al. | 303/125 |
| 6,460,944 B2 * | 10/2002 | Isono et al. | 303/159 |
| 6,474,751 B1 * | 11/2002 | Yamaguchi et al. | 303/116.4 |
| 6,508,523 B2 * | 1/2003 | Yoshino | 303/152 |
| 6,913,326 B1 * | 7/2005 | Ohkubo et al. | 303/11 |
| 7,309,112 B2 * | 12/2007 | Isono | 303/11 |
| 7,571,967 B2 * | 8/2009 | Saito et al. | 303/152 |
| 7,610,974 B2 * | 11/2009 | Abe | 180/65.21 |
| 7,983,827 B2 * | 7/2011 | Nakada et al. | 701/78 |
| 8,500,213 B2 * | 8/2013 | Ohtani et al. | 303/3 |
| 8,608,255 B2 * | 12/2013 | Shimada et al. | 303/152 |
| 2003/0182044 A1 | 9/2003 | Nakamura et al. | |
| 2005/0269875 A1 * | 12/2005 | Maki et al. | 303/152 |
| 2007/0228821 A1 * | 10/2007 | Maki et al. | 303/151 |
| 2009/0105919 A1 * | 4/2009 | Karnjate et al. | 701/70 |
| 2009/0198428 A1 * | 8/2009 | Vourch et al. | 701/91 |
| 2010/0036577 A1 | 2/2010 | Kodama et al. | |
| 2010/0270854 A1 * | 10/2010 | Okano et al. | 303/3 |
| 2010/0299036 A1 * | 11/2010 | Vespasien | 701/70 |
| 2011/0040465 A1 * | 2/2011 | Suda | 701/70 |
| 2013/0020859 A1 * | 1/2013 | Maki | 303/3 |
| 2013/0062932 A1 * | 3/2013 | Yagashira | 303/3 |
| 2013/0204502 A1 * | 8/2013 | Biller et al. | 701/70 |

OTHER PUBLICATIONS

French Search Report Issued Jan. 4, 2012 in FR 11 51185 Filed Feb. 14, 2011.

* cited by examiner

SYSTEM AND METHOD FOR BRAKING A HYBRID OR ELECTRIC TRACTION VEHICLE

BACKGROUND

1. Field of the Invention

The invention relates to hybrid or electric traction motor vehicles, and more specifically to braking systems for these vehicles, particularly braking systems allowing recovery of electrical energy.

2. Description of Related Art

Electrical energy recovery systems make it possible, during braking phases, to use the electric motor of the vehicle in order to provide deceleration, while supplying the batteries of the vehicle to increase its range.

For this purpose, decoupled brake pedal modules are used in such a way that the driver's action on the brake pedal is dissociated from the deceleration that actually takes place. In a decoupled braking module of this type, there is no direct mechanical link between the brake pedal and the braking modules, and an electric braking module or, conventionally, a hydraulic braking module can be used in order to provide the deceleration desired by the driver.

The braking system of the vehicle then sends setpoints to the electric braking module and to the hydraulic braking module, in order to provide the deceleration desired by the driver while increasing the vehicle's range.

The braking systems must also enable the stability of the vehicle and the comfort of the users to be maintained, for example by limiting pitching and jerking. Existing braking systems allowing recovery of electrical energy may, notably in certain operating conditions, send setpoints which cause switching between the electric braking module and the hydraulic braking module.

This switching may be dangerous, since, in emergency braking situations, the most effective braking system, that is to say the hydraulic braking system, must be given priority. Examples of emergency braking situations are those in which a driver has to brake to avoid an unforeseen obstacle, or in which the electric braking module is faulty.

In order to avoid an unforeseen obstacle, the driver depresses the brake pedal quickly enough to avoid the obstacle. Thus the speed at which the pedal is depressed in such a situation is higher than in a normal braking situation. If the electric braking module is faulty, the user may depress the pedal several times, more quickly than in a normal braking situation.

Thus, in emergency braking situations, the brake pedal is depressed more quickly and under greater pressure than in a normal braking situation.

Reference may be made to European Patent Application EP 2055589, which describes an energy recovery method which does not take into account the speed of depression of the pedal or the variation of pressure applied to the pedal. There has also been a proposal, in US Patent Application US 20050200 197, to calculate the braking torque, within a system operating in open loop mode and using predetermined curves. Reference may also be made to U.S. Pat. No. 6,155,365 which describes a method for controlling braking in an electric or hybrid vehicle, but which does not provide for the detection of emergency situations. Finally, US Patent Application US 20060220453 proposes a braking system comprising a regenerative braking limiting module solely for the purpose of avoiding wheel locking situations. The braking systems described in these documents therefore have the drawback of not limiting electrical energy recovery in emergency braking situations in which, for example, the driver depresses the brake pedal quickly.

BRIEF SUMMARY

The object of the invention is to improve the distribution of the electric and hydraulic braking in a hybrid or electric traction motor vehicle, particularly in emergency braking situations.

According to one aspect, what is proposed is a system for braking a motor vehicle fitted with a hybrid or electric traction system, and including a decoupled brake pedal module, a hydraulic braking module, and an electric braking module used for recovering electrical energy during braking carried out by the electric traction system, said decoupled braking module comprising a brake pedal and means for controlling the hydraulic braking system and the electric braking module.

The system comprises means for measuring at least one parameter associated with said pedal, and means for limiting the recovery of electrical energy by the electric braking module.

This parameter associated with the pedal can be used, notably, to detect emergency braking situations. Thus, the limiting of energy recovery enables braking to be performed by using the hydraulic braking module preferentially in emergency situations. In this way, safety during braking is increased.

Advantageously, the braking system comprises means for storing the maximum value of the parameter associated with the brake pedal during a braking phase.

This maximum value can be used to determine whether, during a braking phase, the user has, for example, rapidly modified a parameter of said pedal, and thus to determine whether this braking phase is an emergency braking phase. The term "braking phase" denotes the phase in which the user desires to cause a deceleration. This phase may comprise one or more successive depressions of the pedal, and ends when the pedal is released, possibly after a predetermined wait time.

Thus the energy recovery can be limited as a function of the maximum value of said parameter during a braking phase.

The parameter associated with the brake pedal may comprise the speed of depression of the pedal and/or the derivative of the pressure applied to said pedal.

The speed of the pedal and the variation of the applied pressure are particularly advantageous parameters for the detection of emergency situations. Additionally, the speed and the pressure applied to the pedal can be used to generate a braking torque setpoint of the vehicle. The braking torque setpoint of the vehicle is the deceleration to be provided as desired by the driver.

According to another aspect, what is proposed is a method for braking a motor vehicle fitted with a hybrid or electric traction system with energy recovery using a decoupled brake pedal module, in which, during a braking phase, the energy recovery is limited as a function of at least one parameter associated with said pedal.

Advantageously, the maximum value of said parameter is stored during a braking phase. Thus the energy recovery can be limited as a function of this maximum value.

The maximum value of said parameter can be stored during a braking phase comprising a plurality of depressions of the pedal.

Additionally, the energy recovery is not limited if said maximum value of said parameter is below a first threshold value.

If the maximum value is below this threshold value, the braking phase is not an emergency braking phase.

The energy recovery can be partially limited if said maximum value of said parameter is greater than said first threshold value and below a second threshold value.

It is also possible to prevent all energy recovery if said maximum value of said parameter is greater than said second threshold value.

Advantageously, said parameter comprises the speed of depression of the pedal and/or the derivative of the pressure applied to said pedal.

BRIEF DESCRIPTION OF THE DRAWINGS

Other advantages and characteristics of the invention will be made clear by examination of the following description, provided by way of non-limiting example and illustrated by the attached drawings, in which.

DETAILED DESCRIPTION

Figure 1:
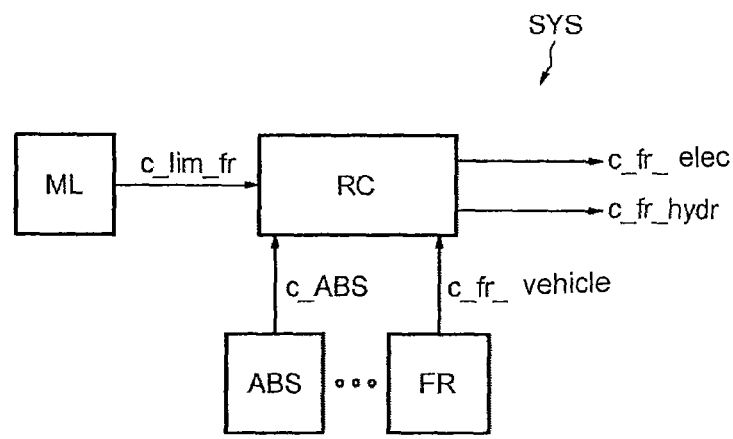
FIG. 1 is an illustration of a braking system according to an aspect of the invention.

FIG. 1 shows a braking system SYS on board a motor vehicle with hybrid or electric traction.

This system comprises an energy recovery limiting module ML, for example a module for limitation as a function of the speed of depression of the brake pedal, or a module for limitation as a function of the derivative of the pressure applied to the pedal, or again a module for limitation as a function of the braking torque setpoint of the vehicle.

The module ML generates an electric braking limiting setpoint, c_lim_fr, to be sent to a torque distribution member RC.

The torque distribution member RC also receives setpoints including the braking torque setpoint for the vehicle, c_fr_vehicle, generated by the driver's action on the decoupled brake pedal module FR, or a setpoint c_ABS generated by an antilock safety member.

The torque distribution member RC may also receive a plurality of setpoints which are omitted here for the sake of simplicity.

Two setpoints are generated by the torque distribution member RC. An electric braking setpoint c_fr_elec is generated by the torque distribution member RC, and is limited at least by the setpoint c_lim_fr. A hydraulic braking setpoint c_fr_hydr is also generated by the torque distribution member RC.

It should be noted that the electric braking setpoint c_fr_elec may be limited by setpoints other than the setpoint c_lim_fr. By way of example, the setpoint c_ABS limits the energy recovery in a conventional way.

The torque distribution member RC shown here makes it possible to limit the electric braking and to use the hydraulic braking, in emergency braking situations.

Figure 2:
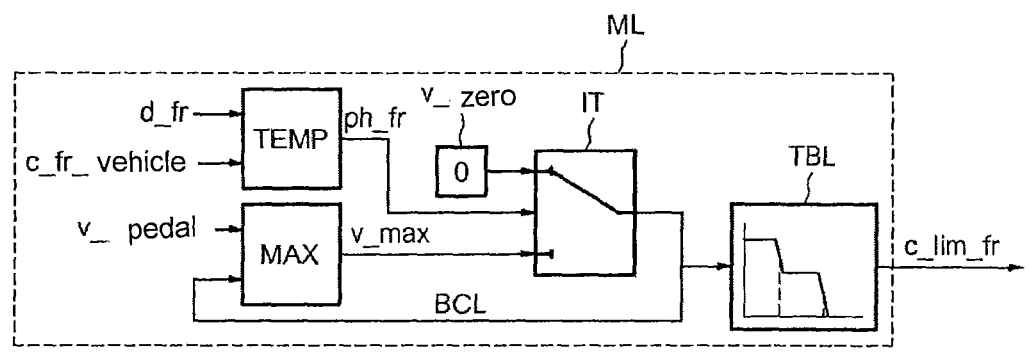
FIGS. 2 and 3 are schematic illustrations of different energy recovery limiting modules.

FIG. 2 shows an energy recovery limiting module ML, positioned, for example, in a motor vehicle with hybrid or electric traction.

A first member MAX is intended to measure and store the maximum value of a parameter associated with a brake pedal of a decoupled braking module of the motor vehicle.

In the embodiment of FIG. 1, the speed of depression of the pedal v_pedal is sent to the member MAX which is intended to measure and store the maximum speed v_max. The member MAX is connected to a switch IT so as to send the maximum value of the speed v_max to this switch.

The module ML is also provided with a timer module TEMP adapted to receive, on a first input, a variable relating to the duration of the braking phase d_fr, and, on a second input, a braking torque setpoint for the vehicle c_fr_vehicle. The braking torque setpoint of the vehicle corresponds to the deceleration desired by the driver when he depresses the pedal. When the brake pedal is released, it is considered that the braking phase which started at the time of a depression of the pedal has not ended within a duration specified in advance, namely the duration d_fr. A braking phase can thus comprise a plurality of successive depressions, separated from each other by a duration shorter than the duration d_fr. By way of example, the duration d_fr may be about five seconds.

The timer module TEMP sends a signal ph_fr, indicating to the switch IT that a braking phase is in progress.

The timer module is particularly useful for situations in which the electric braking is faulty. In this situation, the user depresses the pedal several times in succession, and the member MAX stores the maximum value of the speed of depression of the pedal for the set of depressions of the pedal.

The switch IT also includes an input intended to receive a value v_zero corresponding to a zero speed of depression of the pedal.

As a function of the signal ph_fr, the switch IT connects the maximum value of the speed of depression of the pedal v_max (during a braking phase) or the zero speed v_zero to its output, which is connected to a table TBL.

The output of the switch IT is also connected to the member MAX by means of a feedback loop BCL. The loop BCL can be used, for example, to reinitialize the value v_max for the purpose of a subsequent braking phase.

The table TBL can be used to determine an electric braking limiting setpoint c_lim_fr, that is to say an energy recovery limiting setpoint, as a function of the maximum speed v_max (during a braking phase). This table may comprise means for comparing the maximum speed with a plurality of stored thresholds in order to determine said setpoint c_lim_fr.

It should be noted that the module ML can operate with an input for the derivative of the pressure applied to the pedal, this value replacing the speed of depression of the pedal. In this case, the member MAX receives the derivative of the pressure applied to the pedal and sends to the switch IT the maximum value of the derivative of the pressure applied to the pedal.

Figure 3:
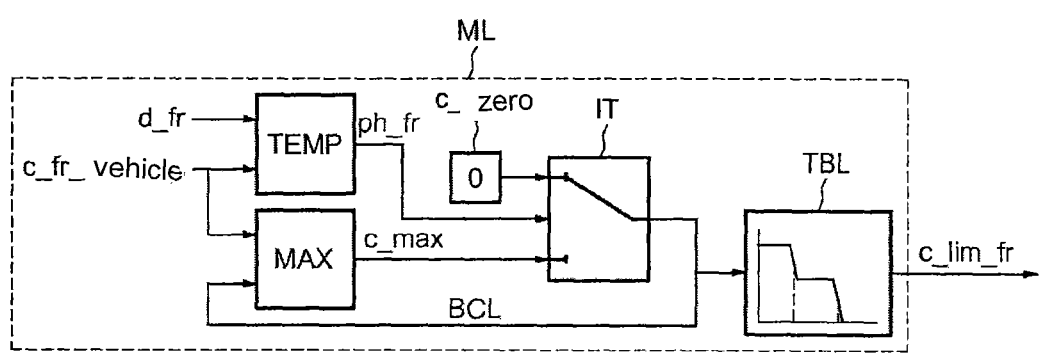

It is also possible to use the braking torque setpoint of the vehicle c_fr_vehicle, as illustrated in the embodiment of FIG. 3, for the limiting module ML.

Thus, this torque setpoint c_fr_vehicle, generated on the basis of the pedal speed and the pressure applied to the pedal, can be used, with its maximum value c_max, to generate a limiting setpoint c_lim_fr during a braking phase. Outside a braking phase, the zero setpoint value c_zero is sent to the table TBL by the switch IT.

In this embodiment, the braking torque setpoint of the vehicle is sent both to the timer module TEMP and to the member MAX. This unique setpoint c_fr_vehicle can be used to detect braking phases and emergency situations.

Figure 4:
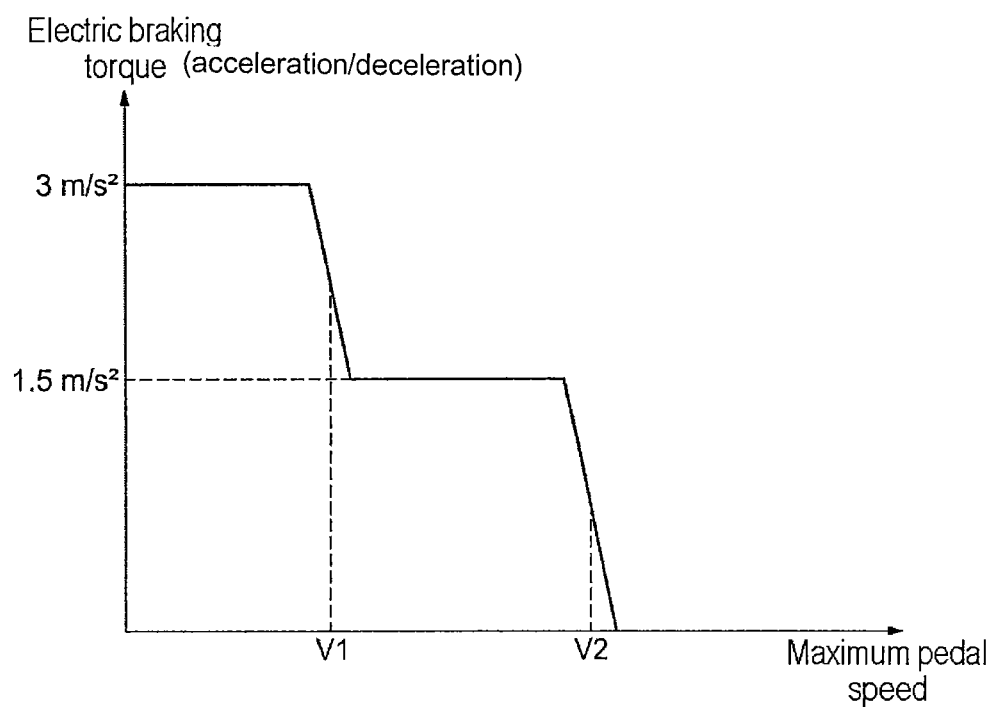
FIG. 4 is an illustration of the limiting of the energy recovery according to an aspect of the invention.

FIG. 4 is a graphic representation of the variation of the maximum electric braking torque as a function of the maximum speed of the brake pedal during a braking phase.

The electric braking torque is limited by the limiting setpoint c_lim_fr, in this case as a function of the maximum speed of the brake pedal.

If the maximum value of the brake pedal speed is below a first speed threshold V1, the electric braking torque is not limited, and may reach a maximum deceleration of about 3 m/s². This situation is not an emergency braking situation. Therefore, the energy recovery is not limited by module ML. It should be noted that the energy recovery may be limited other modules of the vehicle.

If the maximum value of the brake pedal speed is greater than the first speed threshold V1, and below a second speed threshold V2, the electric braking torque is partially limited, for example, to a value of about 1.5 m/s². Thus, an intermediate degree of limitation is obtained, corresponding to emergency braking situations not presenting an immediate risk. The braking is carried out partly by electric braking and partly by hydraulic braking.

For any value greater than the second speed threshold V2, the electric braking torque is fully limited and its value becomes zero. In other words, the energy recovery is fully limited when the maximum pedal speed is greater than the threshold V2. Above the speed threshold V2, it is considered that an emergency braking situation is present, for example a situation in which the driver has to avoid an unforeseen obstacle.

If the electric braking torque is zero, as a function of the braking torque setpoint of the vehicle c_fr_vehicle, a hydraulic braking torque setpoint may be generated so as to provide the deceleration desired by the driver.

The values of the thresholds V1 and V2 are advantageously stored in the table TBL for the purpose of generating the limiting setpoint c_lim_fr. These values are fixed in advance, for example after a calibration step in which the speeds of depression of the pedal in different situations are measured.

It should also be noted that a similar graphic representation can be obtained as a function of the maximum value of the derivative of the pressure applied to the pedal, or of the maximum value of the vehicle braking torque setpoint c_max.

As a result of the invention, the distribution of the electric and hydraulic braking is improved, particularly in emergency braking situations.

The switching between hydraulic braking and electric braking is also limited. In emergency braking situations, the electric braking is preferentially replaced with hydraulic braking.

The invention claimed is:

1. A system for braking a motor vehicle including a hybrid or electric traction system, comprising:
    a decoupled brake pedal module comprising a brake pedal which is moved by a user of the motor vehicle, and a first setpoint generator which generates a braking torque setpoint signal based on movement of said brake pedal;
    a hydraulic braking module;
    an electric braking module used for recovering electrical energy during electric braking carried out by the electric traction system;
    a torque distribution member comprising an input coupled to the decoupled brake pedal module, a second setpoint generator which generates a hydraulic braking setpoint signal, a third setpoint generator which generates an electric braking setpoint, and outputs coupled to the hydraulic braking module and the electric braking module, respectively, such that the torque distribution member is configured to control the hydraulic braking module and the electric braking module; and
    an energy recovery limiting module comprising an input which receives at least one parameter associated with the brake pedal for detecting an emergency braking situation, and a comparison circuit which compares the at least one parameter to stored threshold values and generates an electric braking limiting setpoint signal to limit recovery of electrical energy by the electric braking module based on the at least one parameter such that the energy recovery limiting module partially limits the recovery of electrical energy if a maximum value of the parameter is greater than a first threshold value and below a second threshold value.

2. The system as claimed in claim 1, further comprising a storage configured to store a maximum value of the parameter during a braking phase.

3. The system as claimed in claim 1, wherein the parameter comprises a speed of depression of the brake pedal and/or a derivative of pressure applied to the brake pedal.

4. A method for braking a motor vehicle including a hybrid or electric traction system, comprising:
    recovering electrical energy using a decoupled brake pedal module, including a brake pedal which is moved by a user of the motor vehicle;
    generating at least one parameter associated with the brake pedal for detecting an emergency braking situation;
    comparing the at least one parameter with stored threshold values;
    limiting energy recovery during a braking phase based on a result of said comparing; and
    partially limiting the energy recovery if a maximum value of the parameter is greater than a first threshold value and below a second threshold value.

5. The method as claimed in claim 4, further comprising storing a maximum value of the parameter during a braking phase.

6. The method as claimed in claim 5, further comprising storing the maximum value of the parameter during a braking phase comprising a plurality of successive depressions of the pedal within a predetermined time period.

7. The method as claimed in claim 5, wherein the energy recovery is not limited when the maximum value of the parameter is below the first threshold value.

8. The method as claimed in claim 4, wherein all energy recovery is prevented when the maximum value of the parameter is greater than the second threshold value.

9. The method as claimed in claim 4, wherein the parameter comprises a speed of depression of the brake pedal and/or a derivative of pressure applied to the brake pedal.

* * * * *